(12) United States Patent
Ege

(10) Patent No.: US 9,330,504 B2
(45) Date of Patent: May 3, 2016

(54) 3D BUILDING MODEL CONSTRUCTION TOOLS

(71) Applicant: HOVER, INC., Los Altos, CA (US)

(72) Inventor: Christopher David Ege, San Jose, CA (US)

(73) Assignee: Hover Inc., Los Altos, CA (US)

( * ) Notice: Subject to any disclaimer, the term of this patent is extended or adjusted under 35 U.S.C. 154(b) by 427 days.

(21) Appl. No.: 13/874,435

(22) Filed: Apr. 30, 2013

(65) Prior Publication Data

US 2014/0320488 A1 Oct. 30, 2014

(51) Int. Cl.
*G06T 19/20* (2011.01)
*G06T 17/05* (2011.01)

(52) U.S. Cl.
CPC ............... *G06T 19/20* (2013.01); *G06T 17/05* (2013.01); *G06T 2210/04* (2013.01); *G06T 2219/2021* (2013.01)

(58) Field of Classification Search
CPC ...................................................... G06T 7/10
USPC ......... 345/629, 420, 581, 419, 619, 649, 652, 345/662
See application file for complete search history.

(56) References Cited

U.S. PATENT DOCUMENTS

| 5,844,563 | A * | 12/1998 | Harada et al. | 345/420 |
|---|---|---|---|---|
| 7,830,375 | B2 * | 11/2010 | Styles | 345/419 |
| 2002/0080139 | A1 * | 6/2002 | Koo et al. | 345/473 |
| 2003/0014224 | A1 * | 1/2003 | Guo et al. | 703/1 |
| 2003/0071810 | A1 * | 4/2003 | Shoov et al. | 345/420 |
| 2003/0080976 | A1 * | 5/2003 | Satoh et al. | 345/629 |
| 2004/0051709 | A1 * | 3/2004 | Ogawa et al. | 345/418 |
| 2006/0262134 | A1 * | 11/2006 | Hamiter et al. | 345/619 |
| 2007/0080961 | A1 * | 4/2007 | Inzinga et al. | 345/419 |
| 2009/0132436 | A1 * | 5/2009 | Pershing et al. | 705/400 |
| 2010/0115455 | A1 * | 5/2010 | Kim | 715/781 |
| 2011/0187713 | A1 * | 8/2011 | Pershing et al. | 345/420 |
| 2013/0127910 | A1 * | 5/2013 | Tijssen et al. | 345/642 |
| 2014/0133741 | A1 * | 5/2014 | Wang | 382/154 |

OTHER PUBLICATIONS

Mohan et al, Using Perceptual Organization to Extract 3-D Structures, Nov. 1989, IEEE Transactions on Pattern Analysis and Machine Intelligence, vol. 11, No. 11, pp. 1121-1139.*
Sezgin et al, Sketch Based Interfaces: Early Processing for Sketch Understanding, 2001, Perceptive User Interfaces (PUI), pp. 1-8.*

* cited by examiner

*Primary Examiner* — Maurice L McDowell, Jr.
(74) *Attorney, Agent, or Firm* — Garlick & Markison; Randy Lacasse

(57) ABSTRACT

A method for correcting 3D building objects is provided. Construction tools available within the visualization tool provide edge squaring and edge snapping of the 3D building objects, correcting incoherent angles and planes resulting from errors formed during the construction of the building model. Specified angular thresholds for perpendicular axis and parallel planes are provided in the construction tools to identify inaccuracies within selected buildings and new buildings are redrawn.

19 Claims, 19 Drawing Sheets

3D BUILDING MODEL CONSTRUCTION TOOLS

BACKGROUND OF THE INVENTION

1. Technical Field of the Invention

The technology described herein relates to construction of 3D building models and more specifically for tools to correct building geometries within the 3D building models.

2. Background

Images of a geographic region are used for various uses such as construction and military purposes. Construction planners utilize detailed maps and images of a potential construction site during development planning. Military intelligence use image data to identify or monitor potential military targets or strategic locations. Satellite images of an area are available for these purposes, but due to their "bird's eye" or orthogonal view point, it is difficult to use these images for determining the height of imaged structures or characteristics of imaged structures. These aspects of structures are visible from an angled or "oblique" view point. In alternative embodiments, oblique images are captured through aerial photography. To correlate information between different oblique images, terrain maps and orthogonal images, it is necessary to have precise information about each of the oblique images and the sources of the oblique images. For each image, the camera location, speed of travel, lens focal length, camera angle, altitude, range finding information and similar information are needed to correlate the images to a terrain map.

Construction of 3D building models based on available images collected, in some constructions, results in less than perfect representations. These potential inaccuracies may compromise the precision of information extrapolated from maps using the 3D models. Automatic processing tools, in some instances, confuse building edges with artifacts within the images causing generated 3D rooftop geometries and wall edge definitions to be incoherent. Propagation of the errors throughout the various models within the map affects other models and tools that utilize the information.

BRIEF DESCRIPTION OF THE DRAWINGS

Embodiments of the technology described herein are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

Figure 1:
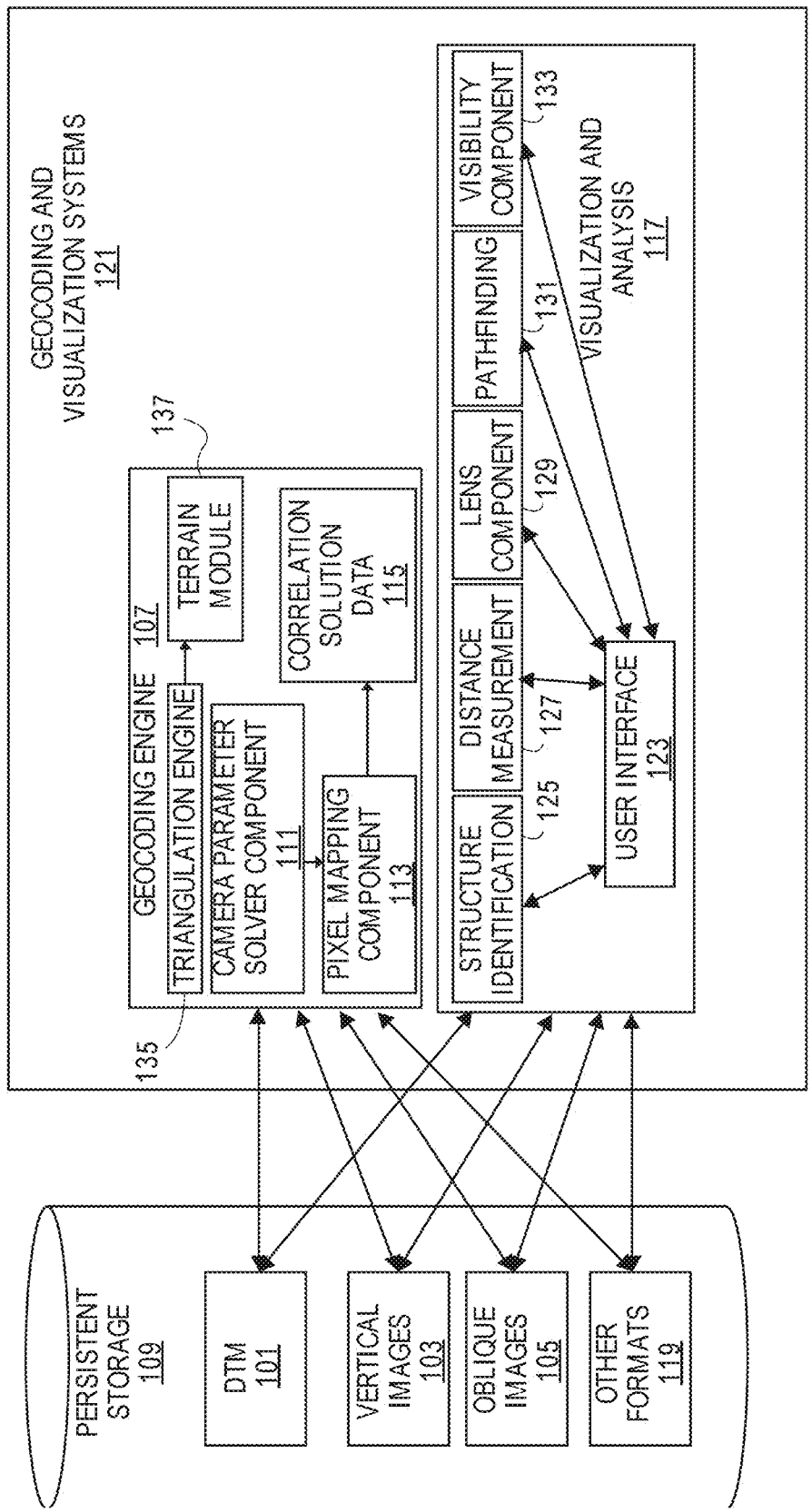
FIG. 1 is a diagram of one embodiment of a geocoding engine.

FIG. 1 is a diagram of one embodiment of a geocoding engine. "Geocoding" as used herein is a correlation of image data to world coordinate data. The world coordinates may be real world coordinate data, virtual world coordinate data or similar coordinate system data. In one embodiment, the geocoding and visualization system 121 has access to multiple types of geographical data and imaging data. This data is stored in an electronic storage medium such as a persistent storage system 109 in communication with the system 121. In other embodiments, the geocoding and visualization system 121 operate on a single machine such as a desktop computer, workstation, mainframe, server, laptop computer or similar computer system or is distributed across multiple computer systems. Persistent storage system 109 is a magnetic data storage system. In alternative embodiments, the persistent storage systems 109 is optical, FLASH or a similar data storage system.

In one embodiment, the geocoding and visualization system 121 has access to a set of digital terrain models (DTM) 101. A 'set' as used herein is any number of items including one item. A DTM 101 includes a set of universal terrain map coordinates identifying the absolute location and elevation of a set of points in a geographical region of the earth. The coordinate system is selected from any coordinate system including latitude and longitude or similar systems. In another embodiment, the system 121 utilizes digital elevation models (DEMs) or similar models and terrain mapping systems in place of or in combination with DTMs. For sake of convenience, DTMs are discussed herein as one example embodiment. DTMs 101 are available for many areas of the world. However, DTMs 101 do not include information about man made structures such as buildings, roads, bridges and similar structures.

Another type of information that is available to the system 121 is vertical images 103 such as orthogonal images and similar images. A vertical image 103 is a vertical or orthogonal view of the terrain and structures in a defined area. As used herein a 'vertical image' is an image captured from an overhead position, a position above a target, or at a right angle or an angle near to a right angle to the target. For example, in one embodiment the image is taken from an overhead position at an eighty-seven degree angle or similar angle close to a ninety-degree angle. In another embodiment, a vertical image is 'rectified' to fit an associated DTM. Rectifying a vertical image entails mapping the pixels of the vertical image to the coordinates of a DTM. For sake of convenience, as used herein a 'vertical image' is either a rectified image or standard image. In alternative embodiments, vertical image 103 is used for measurements of distances and object relationships by providing exact geographical locations for objects such as buildings and similar structures. However, many details and characteristics of structures and objects are hidden in vertical images. For example, in a vertical image, it is difficult to distinguish between different types of objects such as pipes, fences, paths, and ditches, because from the vertical viewpoint they have a similar appearance. A third type of information that is available to the system 121 is oblique imaging 105. Oblique imagery 105 includes images taken at an angle other than the vertical perspective or images derived from vertical imagery that provide perspective after processing. Oblique images provide a perspective line of sight that reveals information that is not visible in an orthophoto view. For example, an oblique image has an angle to the target between zero and eighty-nine degrees.

Figure 2B:
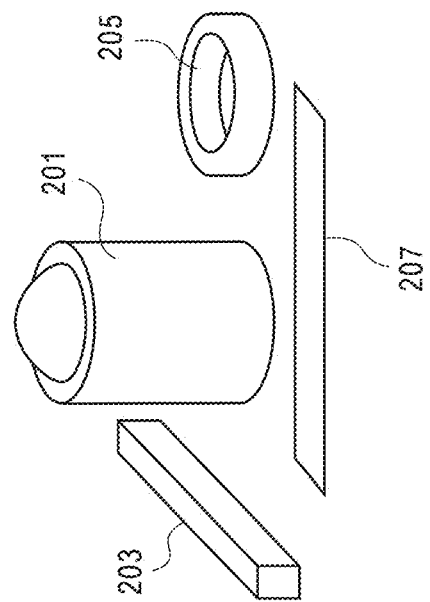
FIG. 2B is an illustration of one embodiment of an oblique photo.
Figure 2A:
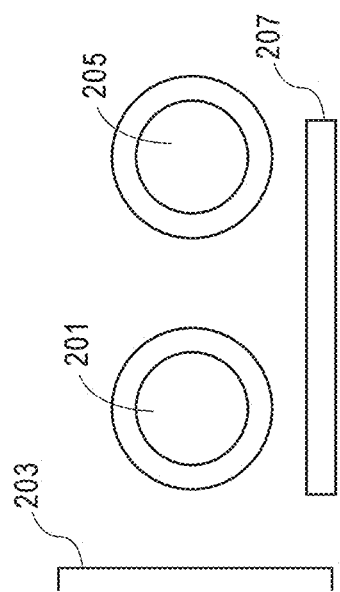
FIG. 2A is an illustration of one embodiment of an orthophoto.

FIG. 2A is a diagram of one embodiment of an example vertical image depicting a first structure 201, a second structure 203, a third structure 205 and a fourth structure 207. Vertical images are captured by aerial photography, satellite imagery, laser radar (lidar), synthetic aperture radar (SAR), standard radar, infrared systems or similar systems. Structures 201 and 205 in the vertical image view depicted in FIG. 2A appear as two concentric circles. Structures 203 and 207 appear to be an elongated structure that runs along side the other structures. However, it is not clear from the vertical image view what each of the structures in fact is. For example, structures 203 and 207 may be ditches, walls, pipes, power lines, shadows or similar structures or terrain features. Structures 201 and 205 may be pits, wells, fences, multilevel structures or similar structures. Without perspective, it is not possible to identify these structures or features.

FIG. 2B is a diagram of one embodiment of an example oblique perspective of the structures depicted in FIG. 2A. Oblique images are captured by aerial photography or imaging systems, satellite imagery, aerial sensor systems, ground based imaging systems, video or video capture technology and similar systems. It is evident from the illustration of FIG. 2B that structure 201 is a silo type structure with a domed roof. Structure 205 is a well structure with only a small portion of the circular wall of the well above ground. Structure 203 is a wall like structure. Structure 207 is a flat structure like a path or road. Structures 201, 203, 205 and 207 appear very different viewed at the angle of an oblique image. In contrast, in the vertical image view of FIG. 2A it is difficult to identify each of the structures. However, it is difficult to correlate an oblique viewpoint image with information such as a DTM to determine real world coordinates for aspects of structures depicted in the image.

Returning to the discussion of FIG. 1, in one embodiment, the geocoding engine 107 receives each of these types of information (DTM, vertical images and oblique images) and correlates each type of data. The geocoding engine 107 includes a triangulation engine 135, camera parameter solver 111, pixel mapping component 113 and generates a terrain model 137 and correlation solution data 115. The geocode engine 107 may be a single application or software module or a set of applications or software modules. In other embodiments, geocode engine 107 operates on a single machine or is distributed over a set of machines.

In one embodiment, to geocode the incoming information and find the correlation between the oblique imagery, the DTM and vertical imagery, it is necessary to determine the ground elevation (z coordinate) information as well as each x and y coordinate associated with these images. The triangulation engine 135 utilizes the DTM to generate the ground z value for each x and y coordinate pair relevant to the set of images or area to be analyzed. The triangulation engine 135 is a separate application or a module or component of the geocode engine 107. The triangulation engine 135 uses the Delaunay Triangulation process and an error-based simplification process to obtain a triangulated model of the terrain 137, which is made accessible to the visualization and analysis component 117.

Other techniques for determining the set of z values that may be used in the analyzed area include natural neighbor interpolation, surface patches, quadratic surfaces, polynomial interpolation, spline interpolation, Art Gallery Theorem, Chvatal's Art Gallery Theorem, compact surface, Japanese Theorem, simple polygon, tessellation, triangulation point, convex hull, halfspace intersection, Voronai diagrams or similar methods and algorithms. In one embodiment, a Delaunay triangulation method is used such as the 'radial sweep,' Watson algorithm, 'gift wrap,' 'divide and conquer,' 'incremental' or similar Delaunay triangulation variation. In one embodiment, a simple case may be a regular grid of elevations that is directly interpolated.

In one embodiment, the triangulation engine 135 outputs a resulting set of x, y and z coordinates or a vertex array as an enhanced terrain model 137. This enhanced terrain model 137 is passed on or made available to the visualization and analysis tool 117. The triangulation engine 135 also passes the enhanced terrain model 137 on to the camera parameter solver component 111 and pixel mapping component 113.

In one embodiment, the camera parameter solver 111 utilizes the terrain model 137, vertical imagery data 103 and oblique imagery data 105. The camera parameter solver component 111 is a separate application or a module or a component of the geocode engine 107. In one embodiment, a vertical image 103 may be rectified to the enhanced terrain map 113 using standard rectifying methods. Rectifying the vertical image includes manipulating the resolution or orientation of an orthophoto to correspond to the proportions and characteristics of the DTM or enhanced terrain map.

In one embodiment, the camera parameter solver component 111 and pixel mapping component 113 are tasked with correlating the oblique imagery 105 with the rectified vertical image and enhanced terrain model. The camera parameter solver 111 utilizes four or more "tie points" in the process of determining the position and orientation of each image and the camera that took the image. This information is then utilized to map each pixel of these pixels to real-world coordinates thereby correlating each of the images with one another by tying them to real-world coordinates. A tie point is a point identified by a user or through automatic means that is located on the ground in each of the rectified vertical images and oblique images.

For the sake of convenience, this discussion utilizes an example where a single vertical or oblique image is correlated to real-world coordinates. This process is extrapolated to combine any number of rectified vertical images and oblique images. Utilizing the tie points, the camera parameter solver component 111 and pixel mapping component 113 determine an x, y and z coordinate for each pixel location in each oblique image. This correlation of pixel locations and coordinates is stored or output as solution data 115 to be utilized by the visualization and analysis tool 117. The solution data 115 and enhanced terrain model 137 are stored for future use in any electronic medium (e.g., persistent storage system 109) that is in communication with the system 121.

In one embodiment, to complete the correlation of the oblique image and the rectified image, the camera parameter solver component 111 determines the exact location of the camera that captured each oblique image including the coordinates, focal length, orientation and similar information related to the camera that captured the oblique image. If this information is known then the known information may be utilized. However, the camera parameter solver component 111 is capable of determining or approximating this information for each oblique image without any extrinsic information about the oblique image.

The pixel mapping component 113 utilizes the camera parameters generated by the camera parameter solver component 111 as well as the enhanced terrain model 137 and maps each pixel of the oblique images to real-world x, y and z coordinates. The pixel mapping component 113 outputs resulting correlation solution data 115 that is then processed and utilized by the visualization and analysis tool 117.

Figure 11:
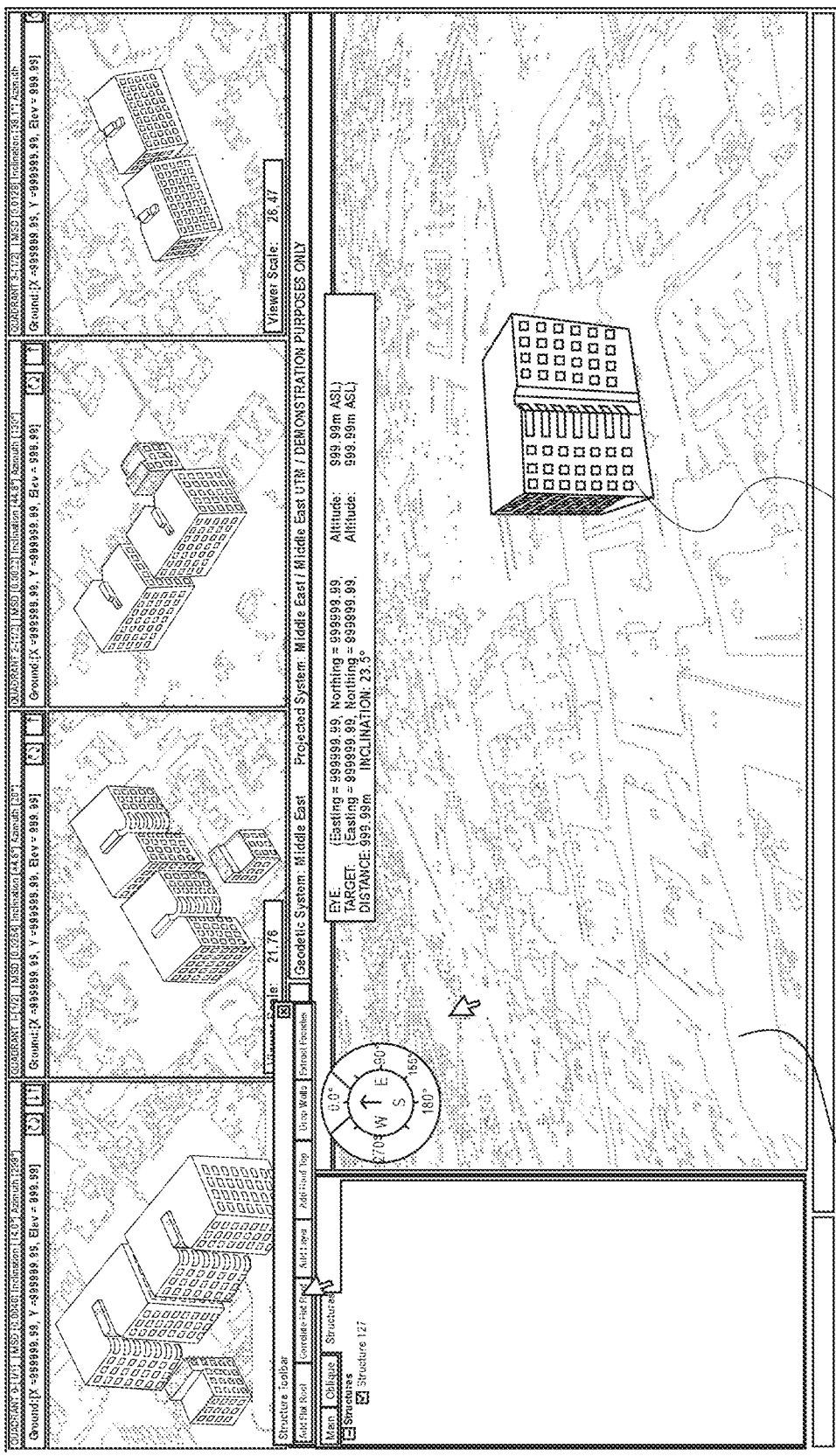
FIG. 11 is a diagram of one embodiment of an interface for three dimensional structure display.

In one embodiment, the visualization and analysis tool 117 allows a user to interact and view the correlated imagery and information. FIG. 11, discussed in further detail below, is a diagram of one embodiment of the interface for the visualization and analysis tool 117. The interface allows a user to view each of the images alone or in combination with one another and view the orientation of each image in relation to the other images. In addition, the visualization and analysis tool 117 provides a set of additional tools for marking points in the images, such as tie points. Other tools provided by the visualization and analysis tool 117 include distance measurement tools for checking a distance within images, path finding tools 131, structure identification tools 125, three-dimensional lens component 129, visibility component 133 and similar tools. The visualization and analysis tool 117 utilizes the solution data 115 and enhanced terrain model 137 to generate the view of and manipulation of images as well as support other tools.

In one embodiment, the geocoding engine 107 and visualization and analysis tool 117 also utilize other data formats and types as input. In one embodiment, the other types of data include video data and video capture data, three dimensional model data, other types of mapping data, extrinsic imagery data such as range finding and altimeter data, imaging device related data such as camera type and focal length of a lens, vehicle data related to the capture of the image such as vehicle speed and similar data.

In one embodiment, the data generated by the geocoding engine 107 is exported to other programs. For example, other applications that utilize the data generated by the geocode engine may include computer aided design (CAD) programs, geographic information systems (GIS) and 3-D model rendering programs. In one embodiment, the solution data 115 and visual representation of the data is formatted or converted for use or display through a website or similarly presented on the Internet. This data is made available and transmitted to electronic devices including laptops, field equipment global positioning (GPS) devices, personal digital assistants (PDAs), command and control systems and similar devices.

In one embodiment, the structure identification component 125 is a component of the visualization and analysis tool 117 or a separate component that interfaces with the visualization and analysis tool 117. The structure identification component 125 receives user input that identifies a façade or rooftop of a structure through a user interface 123 of the visualization and analysis tool 117. The structure identification component 125 then identifies the other features such as the walls of the structure using the solution data 115. The textures of each wall and roof of the structure are retrieved from corresponding images. A model and texture overlay is then created from this data. In other embodiments, the model and texture overlay is rotated in three dimensions through the visualization and analysis tool 117.

In one embodiment, the distance measurement component 127 is a component of the visualization and analysis tool 117 or a separate component that interfaces with the visualization and analysis tool 117. The distance measurement component 127 receives input from a user through a user interface 123 of the visualization and analysis tool 117. The user input identifies a start and end point for a distance measurement. In other embodiments, the distance measurement is an elevation measurement, a ground measurement or any combination thereof. The distance measurement component 127 utilizes the solution data to calculate the distance between the two identified points.

In one embodiment, the three-dimensional lens component 129 is a component of the visualization and analysis tool 117 or a separate component that interfaces with the visualization and analysis tool 117. A user activates the three-dimensional lens component 127 through the user interface 123 of the virtualization and analysis tool 117. The three-dimensional lens component determines the current viewing angle of a user through the user interface 123 of the visualization and analysis tool 117. An oblique or similar image with the closest corresponding viewing angle is selected using the solution data 115. The pixels of the selected oblique image that correspond to a lens area in the user interface 123 are projected or drawn into the lens area to give a three-dimensional perspective to an area of a two-dimensional vertical image. In other embodiments, the lens is moved by a user over any two dimensional vertical image and the displayed three-dimensional perspective is updated as the lens moves and as the point of view in the user interface changes. This update includes selecting a different oblique image to map into the lens based on proximity to the change in the point of view.

In one embodiment, the path finding component 131 is a component of the visualization and analysis tool 117 or a separate component that interfaces with the visualization and analysis tool 117. The path finding component 131 receives input from a user through a user interface 123 of the visualization and analysis tool 117. The user input identifies a start and end point for a path. The user also identifies any number of intermediate points for the path. The path finding component 131 draws the path in each displayed correlated image of the user interface 123 by plotting the path in each image using the solution data 115.

The one embodiment, the visibility component 133 is a component of the visualization and analysis tool 117 or a separate component that interfaces with the visualization and analysis tool 117. The visibility component 133 receives a user input through the user interface 123 and/or data from the path finding component 131. In other embodiments, the visibility component 133 identifies lines of sight to an identified point or path using the solution data 115. The visibility is then displayed through the user interface 123.

Figure 3:
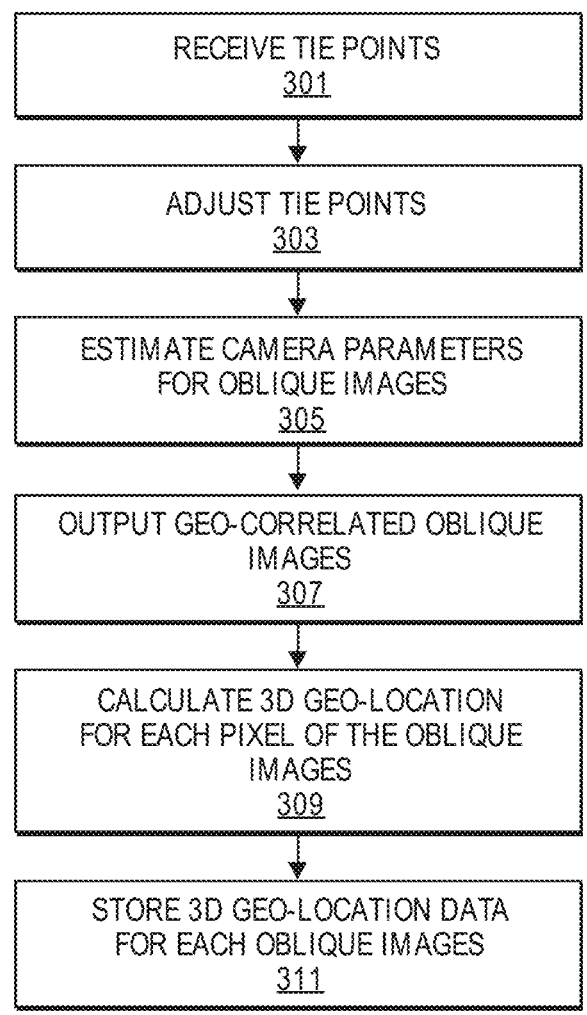
FIG. 3 is a flowchart of one embodiment of a process for geo-locating images.

FIG. 3 is a flowchart of one embodiment of a process for geo-locating images. The process is initiated by input of tie points (block 301). Tie points are a set of pixels or locations within a set of images that match one another. The tie points are locations of aspects of structures or features in each image. In one embodiment, for example, a tie point is a corner of a building and must be natural or man-made features on the ground such as building floor corners, roads or similar structures or features. The same corner is identified in each image.

In other embodiments, any number of images and tie points are input. In one embodiment, a minimum of four tie-points must be identified in each image and include a vertical image or other image that is correlated to a terrain model.

In one embodiment, the visualization and analysis tool adjusts the selected tie points (block 303). The adjustment relies on edge detection and similar algorithms to find specific features such as building corners in proximity to the selected location within an image. The tie points are then moved to correspond to the detected feature or structure. This allows a user to select tie points without having to closely zoom into each image, thereby improving the speed at which tie points are selected.

After a set of tie points is input for each image an estimate of the camera parameters for each image is calculated (block 305). The process of determining the camera parameters is discussed below in further detail in regard to FIG. 4. In one embodiment, the camera parameters are calculated without any extrinsic data related to the images. The camera parameters include the focal length, film size, camera orientation and similar image data. The camera parameters allow for the geocoding or correlation of the oblique images (block 307).

The geocoding or correlation data is then utilized to correlate each pixel of the images to real-world coordinates. This is achieved by recovering the two-dimensional pixel location on a geo-correlated oblique image, given a three-dimensional geo-location chosen in the overlapping area of the vertical image. In one embodiment, the following formula is utilized for this mapping where (X,Y,Z) is the original point in world coordinates, ($X_0$, $Y_0$, $Z_0$) is the camera location in world coordinates, r is the 3×3 rotation matrix representing the camera orientation, FocalLength is the camera's focal length, ScaleFactor is the film scaling factor (in terms of pixels per mm), imgSize.width is the width of the image in pixels, imgSize.height is the height of the image in pixels and result is the resulting point in image coordinates (pixels):

$$P \cdot x = FocalLength \frac{r_{11}(X-X_0) + r_{12}(Y-Y_0) + r_{31}(Z-Z_0)}{r_{31}(X-X_0) + r_{32}(Y-Y_0) + r_{33}(Z-Z_0)} ScaleFactor + \frac{imgSize \cdot width}{2}$$

$$P \cdot y = FocalLength \frac{r_{21}(X-X_0) + r_{22}(Y-Y_0) + r_{23}(Z-Z_0)}{r_{31}(X-X_0) + r_{32}(Y-Y_0) + r_{33}(Z-Z_0)} ScaleFactor + \frac{imgSize \cdot height}{2}$$

The three-dimensional geo-location of a pixel in a correlated oblique image is then calculated. The following formula is used, where P is the original point in image coordinates, h is the expected terrain height of the corresponding world coordinate, ($X_0$, $Y_0$, $Z_0$) is the camera location in world coordinates, and r is the 3×3 rotation matrix representing the camera orientation. FocalLength is the camera's focal length, invScaleFactor is the film scaling factor (in terms mm per pixels), imgSize.width is the width of the image in pixels, imgSize.height is the height of the image in pixels, and W is the resulting point in world coordinates (m):

$$PF \cdot x = \left(P \cdot x - \frac{imgSize \cdot width}{2}\right) * invScaleFactor$$

$$PF \cdot y = \left(P \cdot y - \frac{imgSize \cdot height}{2}\right) * invScaleFactor$$

-continued $$W \cdot x = (X_0 - h)\frac{r_{11}PF \cdot x + r_{21}PF \cdot y - r_{31}FocalLength}{r_{13}PF \cdot x + r_{23}PF \cdot y - r_{33}FocalLength} + X_0$$

$$W \cdot y = (Y_0 - h)\frac{r_{12}PF \cdot x + r_{22}PF \cdot y - r_{32}FocalLength}{r_{13}PF \cdot x + r_{23}PF \cdot y - r_{33}FocalLength} + Y_0$$

$$W \cdot z = h$$

In one embodiment, these formulas are executed through a graphics processor unit (GPU) to improve performance. The above three-dimensional recovery formula requires a valid z-value for the terrain, in order to provide an accurate estimation. The best method of doing this would be to cast a ray, beginning at an x, y image location and then finding the exact intersection of this ray with the enhanced terrain model. However, this process is very expensive computationally and significantly slows down the user interaction with the system. The equivalent operation of this ray-casting operation is performed on the GPU as a "reverse-projection" of the enhanced terrain model onto the image. Using the above two-dimensional recovery, the enhanced terrain model is projected onto an off-screen frame-buffer equivalent to an oblique image size, where every pixel in this buffer contains the z-value of the "reverse-projected" terrain model. To recover the correct z-value that would result by casting a ray beginning at the pixel location and ending at the first hit into the terrain model, a simple look-up of the corresponding pixel of the off-screen frame-buffer is performed.

The results of the mapping of the pixels are output as a correlation solution data set (block 309). This data set is produced for each image or set of images. In other embodiments, this solution set is used by all components and tools in the system including path finding, distance measurement, visibility, three-dimensional lens, structure identification and similar components and tools. The solution data is stored in any persistent storage system in communication with the system (block 311).

Figure 4:
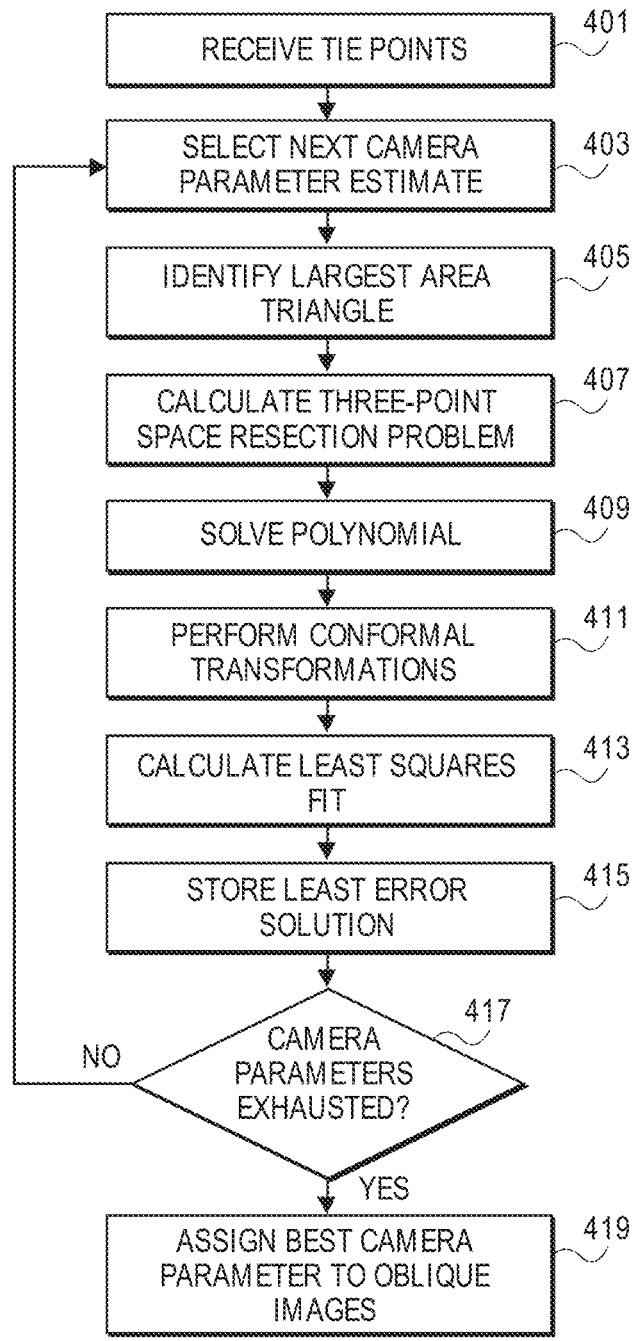
FIG. 4 is a flowchart of one embodiment of a process for determining camera parameters.

FIG. 4 is a flowchart of one embodiment of a process for determining camera parameters. The process of determining camera parameters is dependent on the identification of a set of tie points as described above (block 401). The process then selects a set of initial camera parameters upon which other camera parameters will be estimated (block 403). In other embodiments, the selected initial camera parameters are initial values within a range for each parameter. The process iterates through each combination of selected parameter values. In one embodiment, internal camera parameters, such as focal length and film size, are excluded from the estimation process. These are selected parameters that are iterated through. The entire estimation process is completed in less than fifteen seconds as measured on an Intel Pentium-3 based machine. If any selectable parameters are known, then the iteration is simplified as the number of permutations of the selectable parameters is reduced.

The camera model is described by a set of collinearity equations:

$$Kx = F\frac{r_{11}(X-X_0) + r_{12}(Y-Y_0) + r_{13}(Z-Z_0)}{r_{31}(X-X_0) + r_{32}(Y-Y_0) + r_{33}(Z-Z_0)}$$

$$Ky = F\frac{r_{21}(X-X_0) + r_{22}(Y-Y_0) + r_{23}(Z-Z_0)}{r_{31}(X-X_0) + r_{32}(Y-Y_0) + r_{33}(Z-Z_0)}$$

Where X, Y, Z=Coordinates of a point in world/ground space, $K_x$, $K_y$=Coordinates of a projected point on the image plane, F=Focal length, $X_0, Y_0, Z_0$=Coordinates of the Camera position (Projection Center), and $r_i$=the elements of the 3×3 rotation matrix defining the camera orientation. In the framework as described above, F=focal length is set at the beginning of the iterative process. The projection coordinates $K_x$, $K_y$ are expressed in the ground coordinate system in millimeters. Thus, given a film size D, (which is also set at the beginning of the iterative process), and the pixel coordinates $P_x$, $P_y$ of a projected point on the image plane, then the ImageScale=max(ImagePixelDim$_x$, ImagePixelDim$_y$)/D; $K_x$=($P_x$−CenterOfImage$_x$)*ImageScale; and $K_y$=($P_y$−CenterOfImage$_y$)*ImageScale.

The selected set of parameter values are utilized to identify a largest area triangle within the set of images using the tie points (block 405). The largest triangle is used to calculate a three-point space resection problem using the world-image pairs for the tie points (block 407). The three tie points that form the largest area triangle on the ground are identified. To identify the largest area triangle, all possible 3-point combinations are taken to compute the area of their formed triangle using Heron's formula, which states that the area (A) of a triangle whose sides have lengths a, b, and c is:

$$A = \frac{\sqrt{(a+b+c)\cdot(a+b-c)\cdot(b+c-a)\cdot(c+a-b)}}{4}.$$

The three-point space resection problem is solved where O is the perspective center (or top vertice of a tetrahedron) and $P_1, P_2, P_3$ are three world space reference points (forming the base of the tetrahedron) whose distances a,b,c (i.e. the distances between $P_1, P_2, P_3$) are also known. From the image coordinates of the given points we form unit vectors along the edges of the tetrahedron $OP_1, OP_2, OP_3$ and then use the dot products of these vectors to get the internal angles $\alpha, \beta, \gamma$. This leaves distances from $P_1, P_2, P_3$ to O referred to as $S_1, S_2$ and $S_3$ as the unknowns to be computed. Given points P1, P2, P3 on the ground and the internal angles $\alpha, \beta, \gamma$, (computed by forming OP1, OP2, OP3 on the image plane), we recover the distances S1, S2 and S3 which are then used to recover the center of projection O. To accomplish this, Grunert's solution (as described in Tan, W., 2004, *Surveying and Land Information Science*, 64(3):177-179) is followed, which uses the law of cosines. This involves the solving of quartic equations in order to obtain a solution. Example solutions to the quartic equations include the Ferrari Polynomial (as described in Tan, Ibid), which returns two roots, and the use of the Newton-Raphson iteration (as described in Tan, Ibid) using a starting point of v=1.0. In this implementation, two starting points are used for the Newton-Raphson iteration (v=0.5, v=1.5), in order to yield two solutions. In other embodiments, the Abramowitz and Stegun algorithms are also used for a solution to the quartic equation, which yields an additional 4 solutions (as described in Abramowitz, M and Stegun, I. A., 1972, Handbook of Mathematical Functions, U.S. Department of Commerce). Using each of these methods results in a total of eight solutions to the three-point resection problem (block 409).

A conformal transformation for each of the guess values from the eight solutions is then calculated (block 411). Given the distances S1, S2 and S3 the locations of the 3 model points in the camera coordinate system are calculated as follows: $P_1'=S_1\cdot i_1$, $P_2'=S_2\cdot i_2$, $P_3'=S_3\cdot i_3$ with the vectors $i_1, i_2, i_3$ formed as $i_1$=(PC$_1$.x, PC$_1$.y, F), $i_2$=(PC$_2$.x, PC$_2$.y, F), $i_3$=(PC$_3$.x, PC$_3$.y, F) where F is the given focal length defined at the beginning of iteration process. In one embodiment, given the points $P'_1$, $P'_2$, $P'_3$ and their counterparts PC$_1$, PC$_2$, PC$_3$ all in the camera coordinate system a conformal transformation is applied as defined by Dewitt (as described in Dewitt, B. A. 1996, *Photogrammetric Engineering and Remote Sensing*, 62(1):79-83)

The results of the conformal transformation give an initial approximation X, Y, Z for the camera position, and a set of the angles for the initial approximation of the camera orientation. The space resection algorithm is then used to compute the final solution. The collinearity equations described above are first linearized using Taylor's theorem. The resulting system is then solved using the Gauss-Newton method. One of the challenges of solving the space resection problem using this approach is that a good initial approximation is required, otherwise the algorithm will diverge. The process described above ensures that a good approximation is provided for general camera orientations, as opposed to the assumptions of planar imagery that previous methods have relied upon.

Finally, a least squares fit is calculated for the solution (block 413). In one embodiment, the least squares fit is performed using the Gauss-Newton method. A comparison is made between the calculated least squares fit and a stored least squares fit that represents a previous 'best guess' in selection of the camera parameters. If the calculated least squares fit is an improvement over the stored least squares fit, then the selected camera parameters are stored along with their least squares fit value (block 415). If the calculated least squares fit is not an improvement, then the camera value parameters and their least squares fit are discarded.

A check is made to determine whether all of the camera parameters have been exhausted by iteration through each permutation of the combination of the camera parameter values (block 417). If all of the permutations of the parameters have not been exhausted, then the next set of parameters is selected and the process continues (block 403). If all of the parameter permutations have been exhausted, then the stored set of parameters that represent the best fit for the images are assigned to the corresponding images (block 419).

Figure 5:
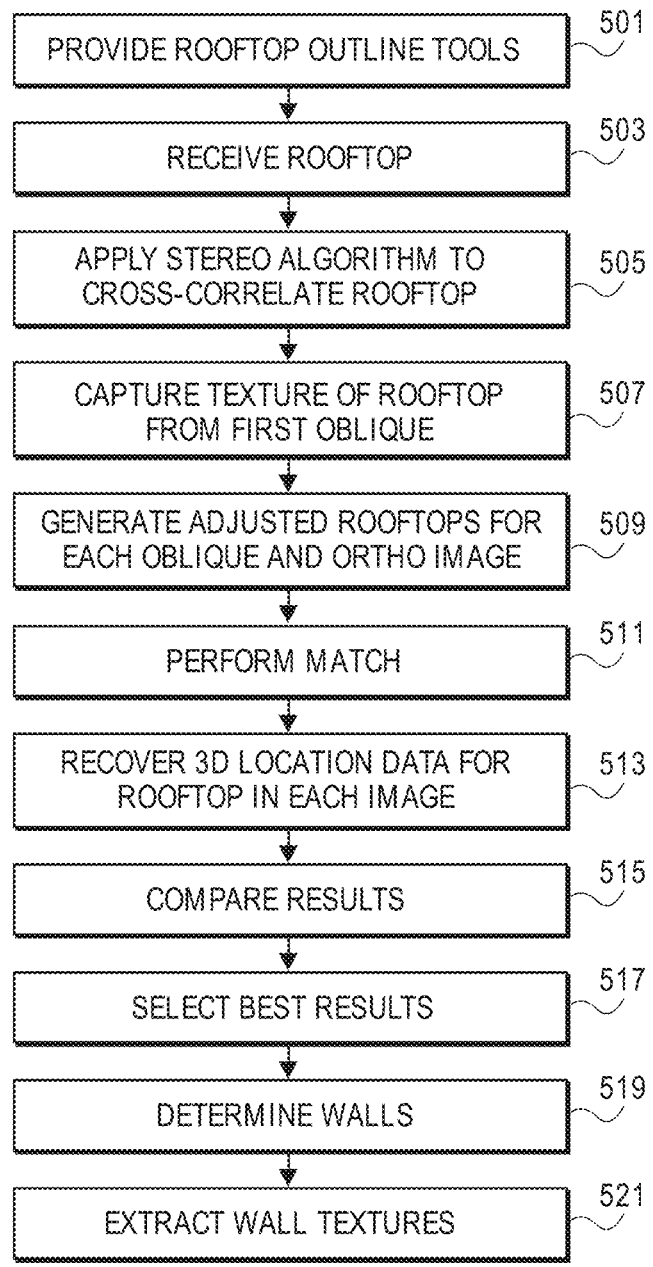
FIG. 5 is a flowchart of one embodiment of a process for structure extraction.

FIG. 5 is a flowchart of one embodiment of a process for structure extraction. The process of structure extraction identifies and generates three-dimensional models of buildings and similar structures within an area within the images selected by a user. The process is initiated by a user identifying a rooftop or similar aspect of a structure (block 503). The user identifies the input aspect of the structure through the user interface of the visualization and analysis tool. The interface provides a line drawing tool, rectangle drawing tool, circle drawing tool or similar set of tools to enable a user to match a shape to that of an aspect of a structure. (block 501).

The input aspect of the structure is identified in a single image. In one embodiment, the image is either the orthographic or any of the correlated oblique views. The structure extraction process then identifies the aspect in each of the correlated images by applying a stereo algorithm to cross-correlate the rooftop or similar aspect across each correlated image (block 505). This will reveal the 3D positions of the roof points.

In the image with the identified aspect of the structure a texture is extracted within the boundary of the aspect (block 507). For example, when the aspect is the rooftop, the pixels of the rooftop are extracted as a texture. A copy of the extracted texture is then adjusted for the orientation of each of the correlated images to generate a texture that should match one present in each image (block 509).

A pattern matching algorithm is then utilized to locate the generated textures in each of the corresponding images (block 511). The search is centered on the location data generated in the oblique targeting and cross-correlation calculation. In one embodiment, a GPU-based pattern matching method referred to as an "occlusion query" is utilized. The pattern matching method counts the number of pixels that have been successfully drawn from a shape. A fragment program cancels or rejects the pixels of a shape to be drawn using a comparison measure. The occlusion query counts the number of pixels that were cancelled or rejected. Once the adjusted shape for each oblique is generated an iterative process is applied. The adjusted shape is drawn with all the pixels activated. In this embodiment, a count of the maximum possible number of pixels is drawn in the situation where a full match occurs. The count is used to normalize all subsequent matches for comparisons. For each oblique, the set of all possible x, y locations for the adjusted shape is iterated through. At each iteration, the fragment shader is activated to perform the texture comparison. The number of successfully drawn pixels is counted using the occlusion query. The number of successfully drawn pixels is normalized by dividing by the maximum number of pixels and a comparison with previous results is made. The result with the highest score is chosen as the match.

The texture of the adjusted rooftop is compared to the corresponding oblique image pixel by pixel at the test location. The comparison includes a comparison of the color of each corresponding pixel ($color_1$, $color_2$). In one embodiment, a color-space conversion to the LAB color-space is performed where the luminance channel is suppressed by a factor of 0.5. The distance of the resulting color-space vectors is then compared to a predefined threshold to determine a match as follows:

$$Match = vectorLength\left(RGBtoLAB(color_1) \cdot \begin{bmatrix} 0.5 \\ 1.0 \\ 1.0 \end{bmatrix} - RGBtoLAB(color_2) \cdot \begin{bmatrix} 0.5 \\ 1.0 \\ 1.0 \end{bmatrix}\right) < Threshold$$

The fragment shader discards the pixel if it returns false to the comparison. This causes only the similar pixels to survive and be counted during the process of an occlusion query process. The system automatically matches the selection within the other obliques using the texture from the user-marked oblique, adjusted to the image space (i.e., orientation) of the respective oblique. The system evaluates several positions for the adjusted texture by superimposing the reference texture onto the other oblique images and comparing their luminance and colors pixel-by-pixel. These comparisons are performed within fractions of a second, by taking advantage of a combination of GPU based occlusion queries and specialized fragment programs. In cases where the above automated selection fails, the user indicates the correct position of the rooftop by clicking his selection in an additional oblique.

Upon matching the pattern, the three-dimensional location data of the pattern is recovered from each image (block 513). The results of each recovery are compared (block 515) and a selection of the best results is made (block 517). This helps to correct for distortion or inaccurate structure identification in the first image. The other aspects of the structure are then determined (block 519). For example, if the rooftop of a building has been determined then the walls are determined by dropping edges from each corner of the building to the base elevation of the terrain (block 519). The structure walls are extracted as one wall per rooftop line segment. These walls consist of the roof-points with their counterparts on the ground. In one embodiment, the user refines this selection by dragging the points of the outline. This immediately affects the extracted building.

This results in a three-dimensional model of the structure or feature. The textures associated with each side, wall or other aspect of the modeled structure or features are then extracted from the image with the best point of view for that aspect (block 521). The extracted textures and model are stored separately or added to the correlation solution data or similar data structure. In other embodiments, these models and textures are utilized by other models to generate three-dimensional representations of the structures and features of an area.

In one embodiment, computer based visualization and analysis tools are provided to correct incoherencies in three-dimensional (3D) building objects developed as a result of aerial images. The construction of the 3D building models based on information extracted from aerial images, in some instances, produces incoherencies. Typically, incoherencies manifest themselves as non-perpendicular angles or nonparallel planes. For example, extraction and construction of a building's corners, in some instances, provides a 3D model of the building having one corner that is displayed as non-perpendicular but is perpendicular in actuality. The visualization and analysis tools provide tools to identify and correct incoherencies in the 3D building objects.

Edge squaring, for example, is performed on the three-dimensional objects where incoherent angles (those angles that should be perpendicular but were not generated as such during object construction) are identified. The visualization and analysis tools provide the user with an interface to display and analyze any incoherent angles. The incoherent angles are corrected and building wall positions are calculated to support existing object data and new known angles. Vertex movement, as a result of correcting incoherent angles, is minimized by splitting each vertex pair (e.g., corner) adjustment in half and ensuring pure 90 degree angles between perpendicular groups of planes (described further hereafter).

Incoherent angles are determined using angular thresholds that are established based on statistical modeling of various large datasets of diverse three-dimensional architecture. For example, in a dataset of 10,000 building objects, it was determined that in most cases where a vertex angle between 87 and 93 degrees was found, that angle should have been perpendicular (90 degrees). Therefore, in this example embodiment, the angular threshold was established at +/−3 degrees for perpendicular axes. While this angular threshold reflects an optimized range for this embodiment, other ranges smaller or larger are envisioned without departing from the scope of the technology described herein. For example, ranges may be changed based on the quality of the orthogonal imagery (e.g., lower or higher quality) or based on a specific architectural feature (e.g., bay window). In addition, while the 90 degree example is used throughout the description, other known architectural angles, for example 135 degrees for a bay window are considered within the scope of the technology described herein and are correctable accordingly.

In one embodiment, angular thresholds are used to establish groups of like angles. In an exemplary embodiment, a first edge becomes the initial grouping plane location. As edges are added to a specific grouping, a weighted edge length is generated that represents the new edge length raised to the power of the influence value (typically 3). For example, if this value is zero, then the main axis is calculated as the average of all of the edge orientations with the angular threshold regardless of their length. The larger that this value is the more that the longer edges and the less that the shorter edges have influence over the estimate of the axis going through the edges. A weighted edge plane is generated for each edge that is the distance of the new edge from the initial edge plane multiplied by the grouping plane normal minus the initial edge plane multiplied by the weighted edge length. The weighted length sum is maintained as the sum of the weighted edge lengths. The sum of the weighted edge planes is maintained. The grouping plane that the edges are adjusted to is maintained as the sum of the weighted edge planes divided by the weighted length sum. While this method of establishing groups of like angles reflects an exemplary embodiment, other methods of recognizing like angles are envisioned without departing from the scope of the technology described herein.

Figure 6:
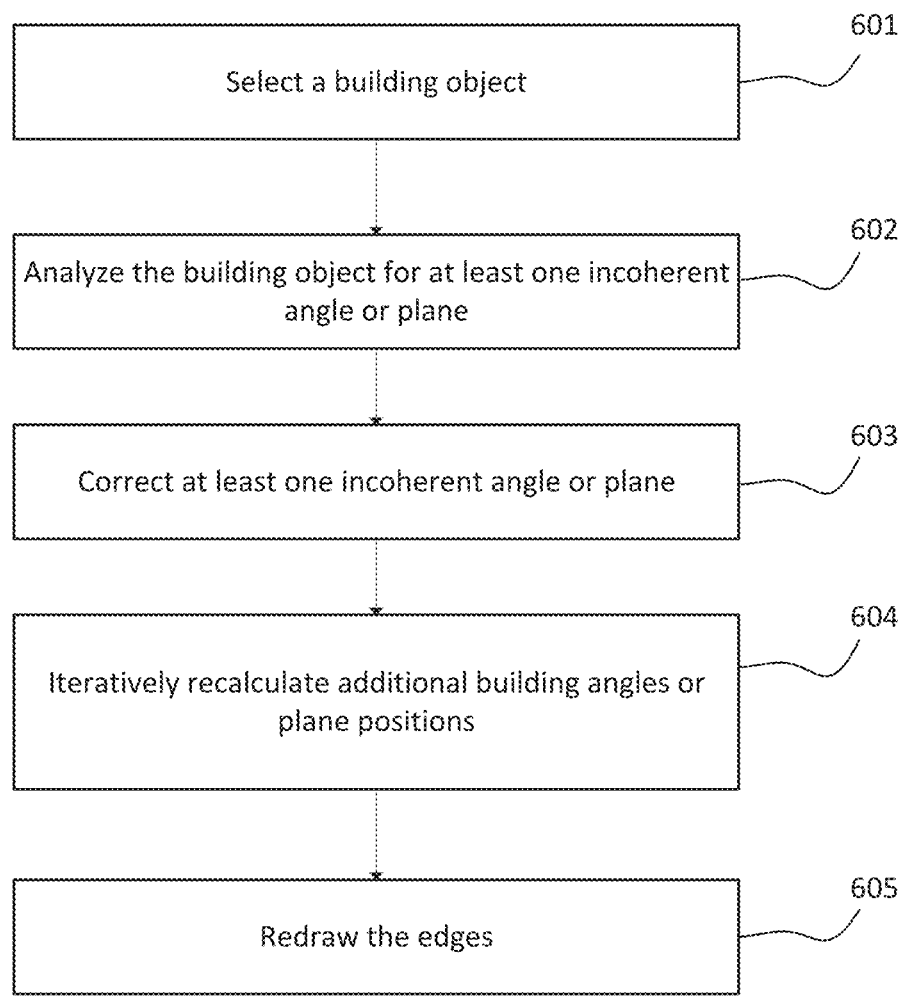
FIG. 6 is a flowchart of one embodiment of a process for correcting incoherencies in three-dimensional models.

FIG. 6 is a flowchart of one embodiment of a process for correcting incoherencies in three-dimensional (3D) building objects. The process estimates a main axis going through the walls for a set of selected structure(s), finds all elements within a specified angular threshold of being perpendicular or parallel. The process is initiated when a 3D building object of interest is selected (block 601). In one embodiment, the building object of interest is selected in a user interface by entering in an address, automatically selected using the location of the user, by clicking the location on a map, or touching a location on a map. In another embodiment, the selection process is automated. For example, the computer based visualization and analysis tools sequentially select and analyze building objects within a specified geographical area. The building object is analyzed for incoherent angles or planes (block 602). The identified incoherencies are corrected (block 603). For example, an identified incoherent angle of 87 degrees is corrected to 90 degrees or walls out of parallel by 2.5 degrees are made parallel. In addition, other building angle or plane positions are iteratively recalculated (block 604). For example, correcting one incoherent angle may affect a second angle or plane position. As previously mentioned, vertex movement, as a result of correcting incoherent angles, is minimized by splitting each vertex pair (e.g., corner) adjustment in half and ensuring pure 90 degree angles between perpendicular grouping planes. The 3D building object is then redrawn to satisfy newly calculated building angles and/or positions (block 605).

Figure 7A:
FIGS. 7A and 7B collectively illustrate before and after diagrams of one embodiment of an interface illustrating edge squaring.
Figure 7B:
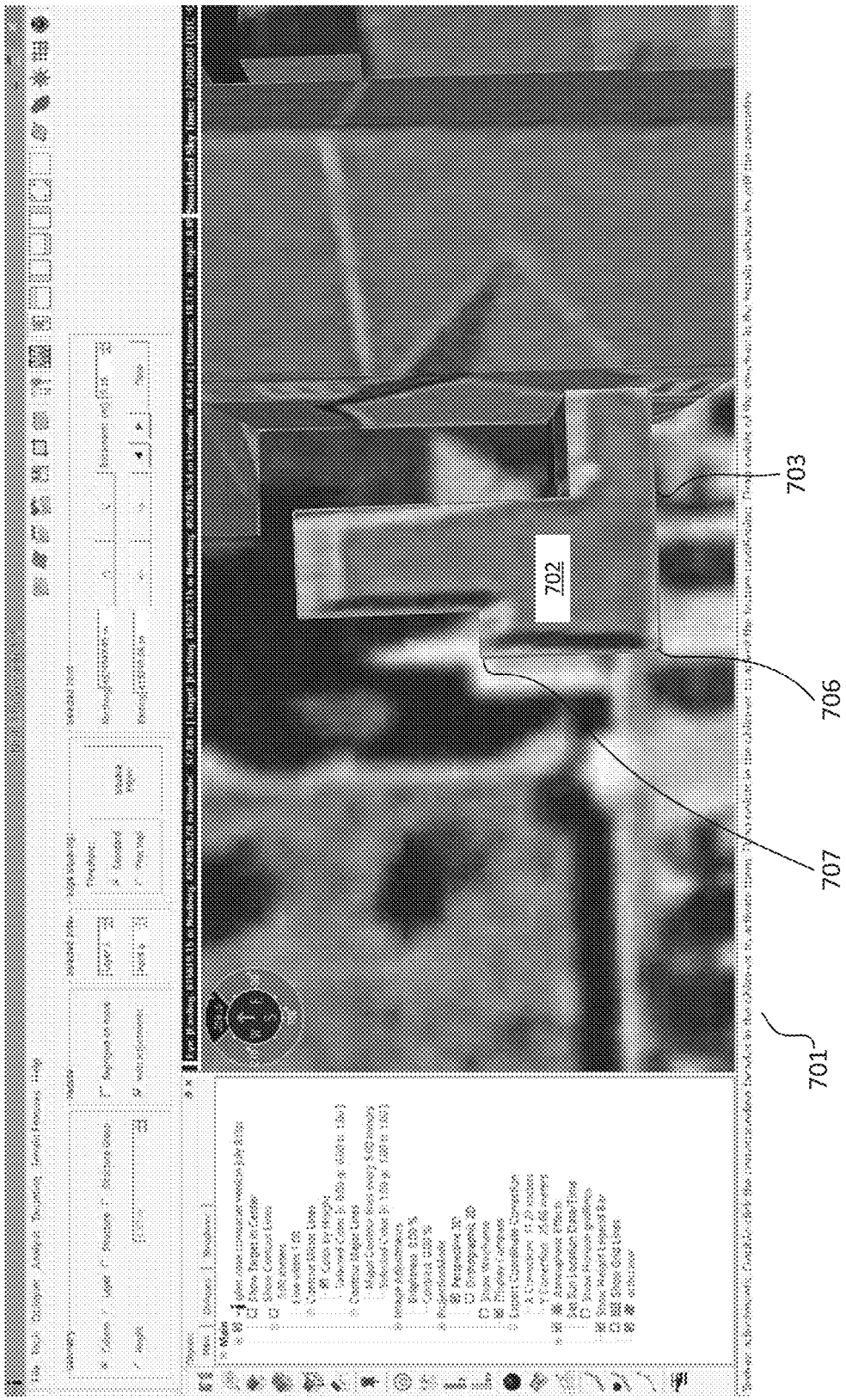

FIG. 7A is a diagram of one embodiment of an interface for edge squaring. The user has selected building 702 which is displayed to the user through interface 701. Selected building 702 is presented with rooftop lines 703 having incoherent angles 704 and 705 (established during modeling). An edge squared, corrected building is shown in FIG. 7B. Interface 701 displays selected building 702 having perpendicular vertices 706 and 707 with corrected geometry.

In another embodiment, architectural façades within a structure that are within a threshold of being parallel and near the same plane (overlapping or otherwise) will be identified and snapped (overlaid to fit geospatial data points) to the correct plan and with a calculated parallel configuration. In one embodiment, perpendicular angles are corrected before correcting parallel plane incoherencies.

Figure 8A:
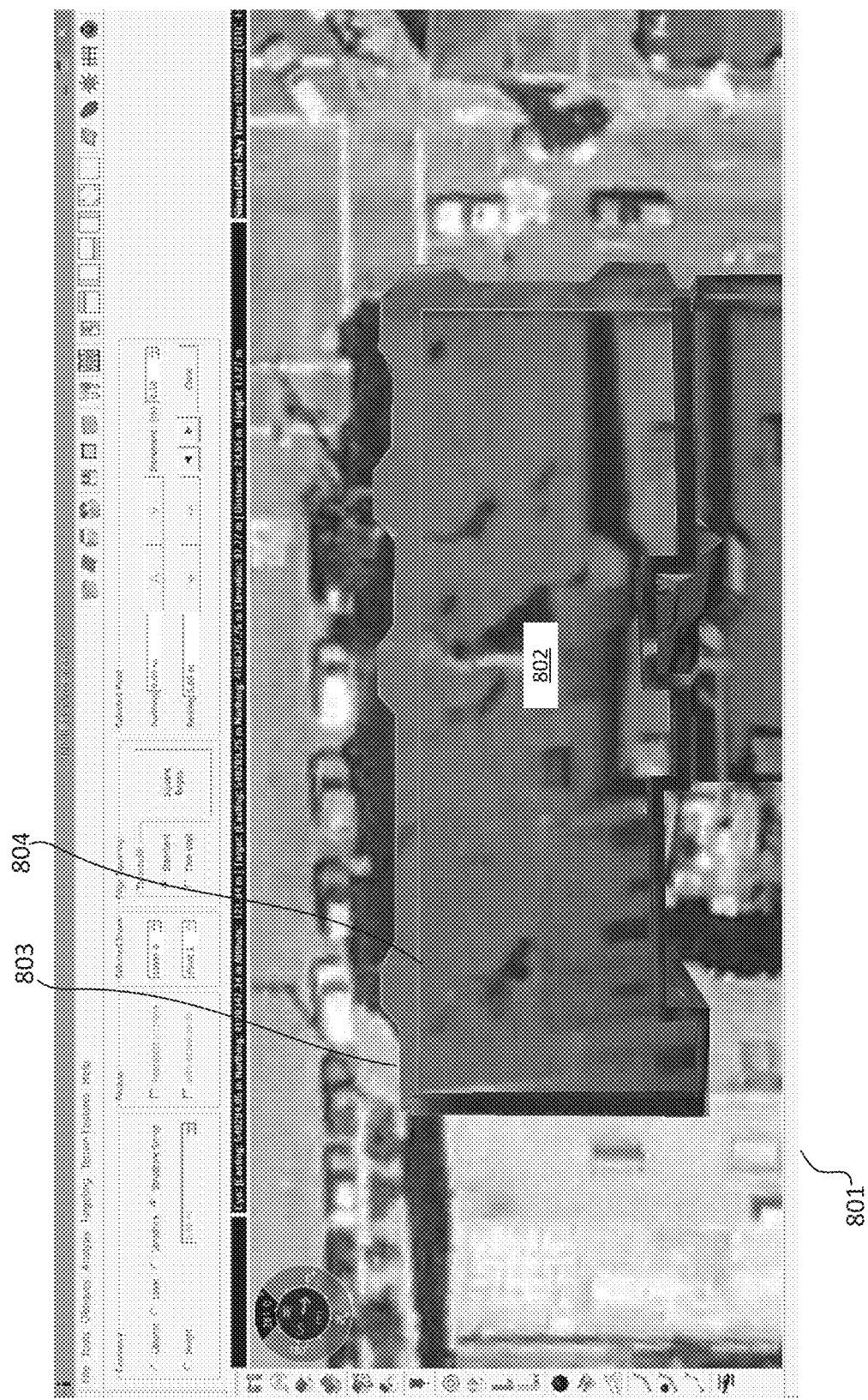
FIGS. 8A and 8B collectively illustrate before and after diagrams of one embodiment of an interface illustrating edge snapping.
Figure 8B:
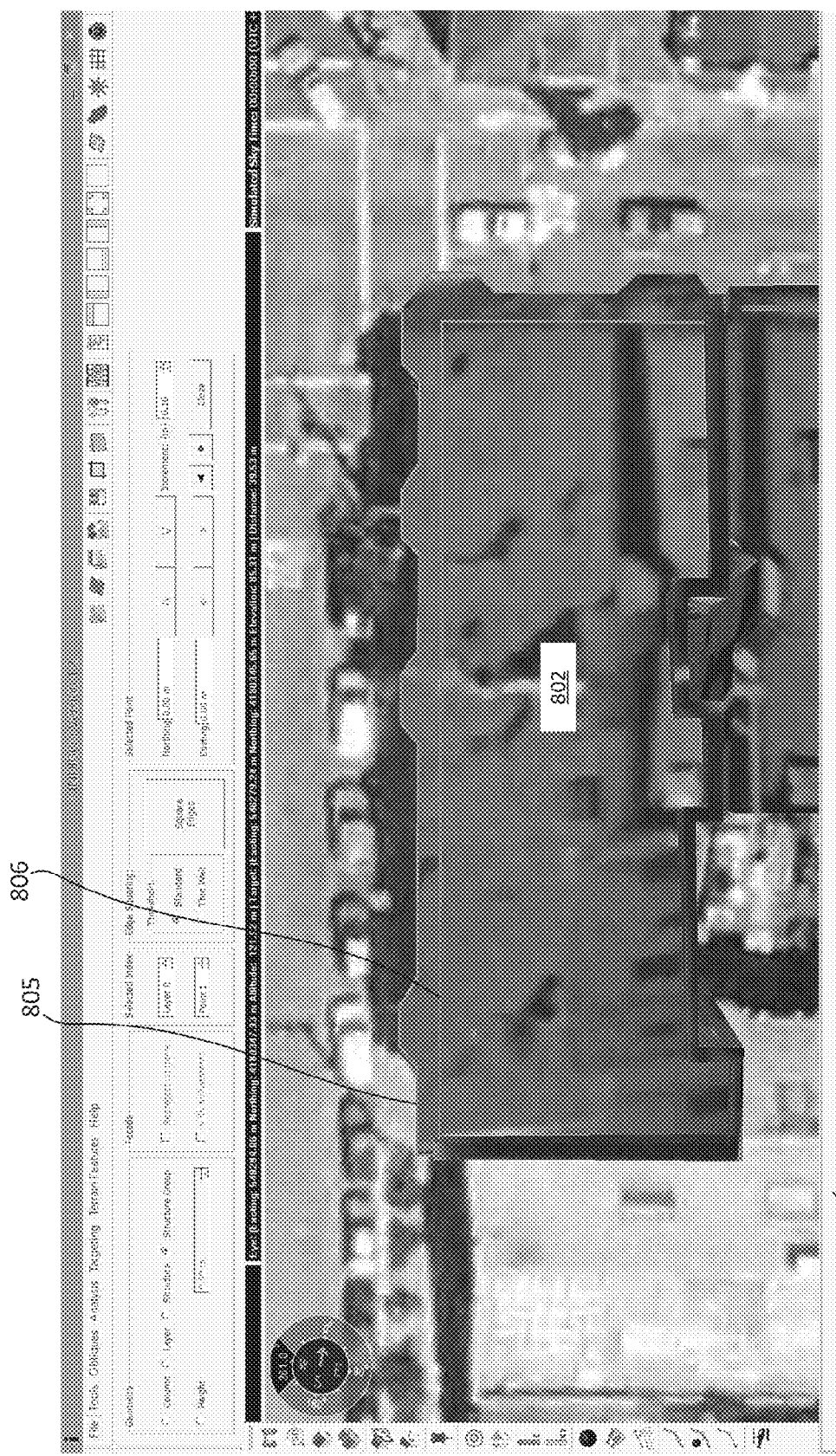

FIGS. 8A and 8B represent diagrams illustrating edge snapping of a user selected building object of interest. FIG. 8A shows interface 801 displaying selected building object of interest 802. Building object of interest 802 is evaluated for incoherent planes (those that should be parallel and/or in the same plane but were not generated as such during building object construction). In FIG. 8A, planes 803 and 804 were constructed in a nonparallel configuration and were identified as incoherent planes. In FIG. 8B, the incoherent planes are corrected (planes 805 and 806) by shifting vertices of those edges that should be in the same plane such that they align in a parallel arrangement. Building object wall positions are calculated to support existing object data and new known edges. The building walls are redrawn with the new geometric configuration, eliminating the incoherent planes of the building. This includes adjusting the corresponding plane intersections (building corners) to correct geometry while maintaining influence from external precise façade location data.

Figure 9:
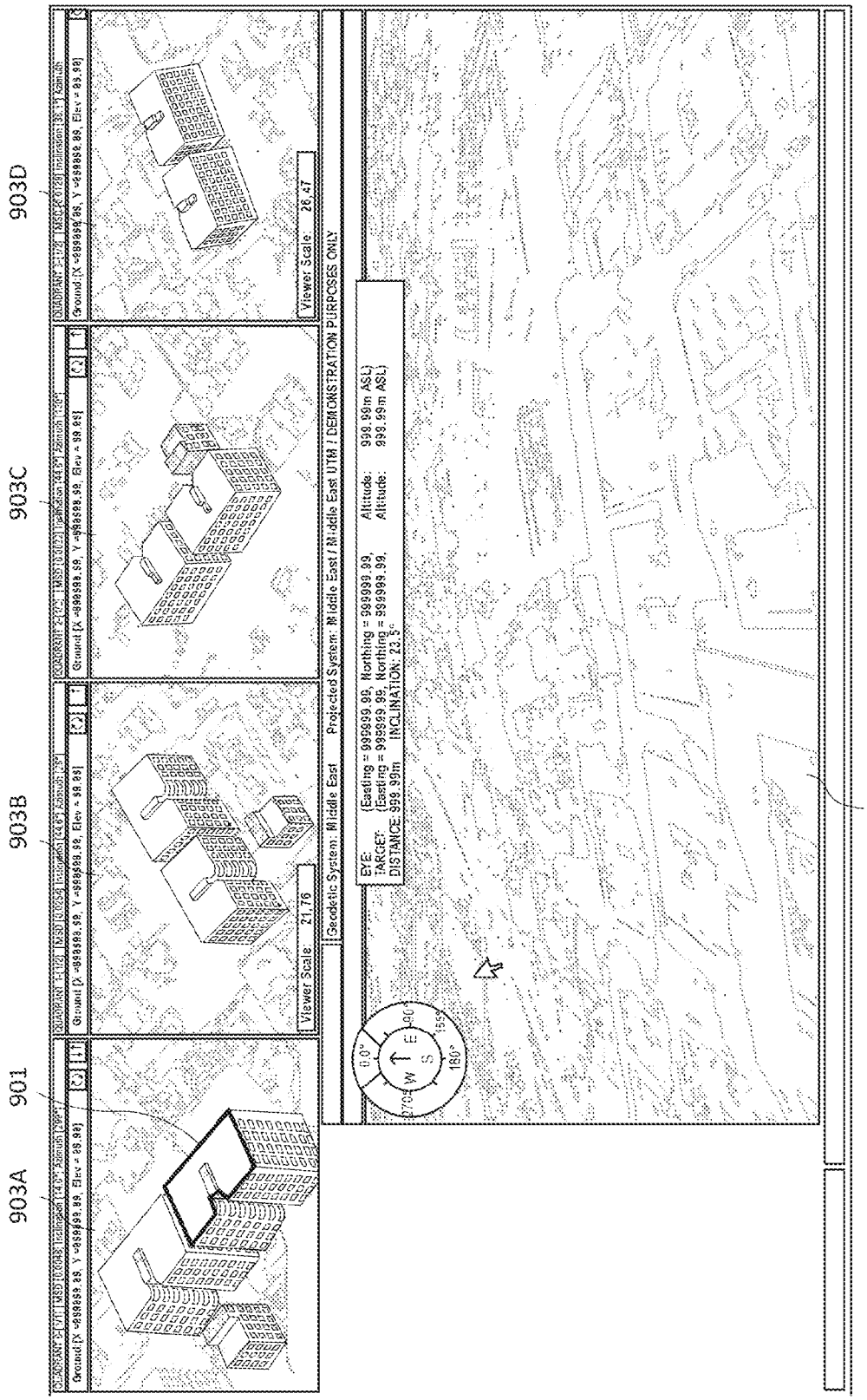
FIG. 9 is a diagram of one embodiment of an interface for inputting the coordinates of a tie point on a structure.

FIG. 9 is a diagram of one embodiment of an interface for inputting the coordinates of a tie point on a structure. The input of tie points is illustrated in the context of a user identifying an aspect of a structure for use in determining a three dimensional model of the structure. The user has selected 901 the rooftop of a building in a first oblique 903A. In the illustrated example, the images 903A-E have been correlated and are being displayed such that the same point is being viewed from the respective angles of each image. The terrain model with the vertical image draped over it is displayed in window 903E. However, the identification of tie points prior to correlation is the same. A user selects a set of points in one of the images. In this example, the selection in image 903A has been completed. In alternative embodiments, the user selects one additional point correspondence in any of the images 903B-E.

Figure 10:
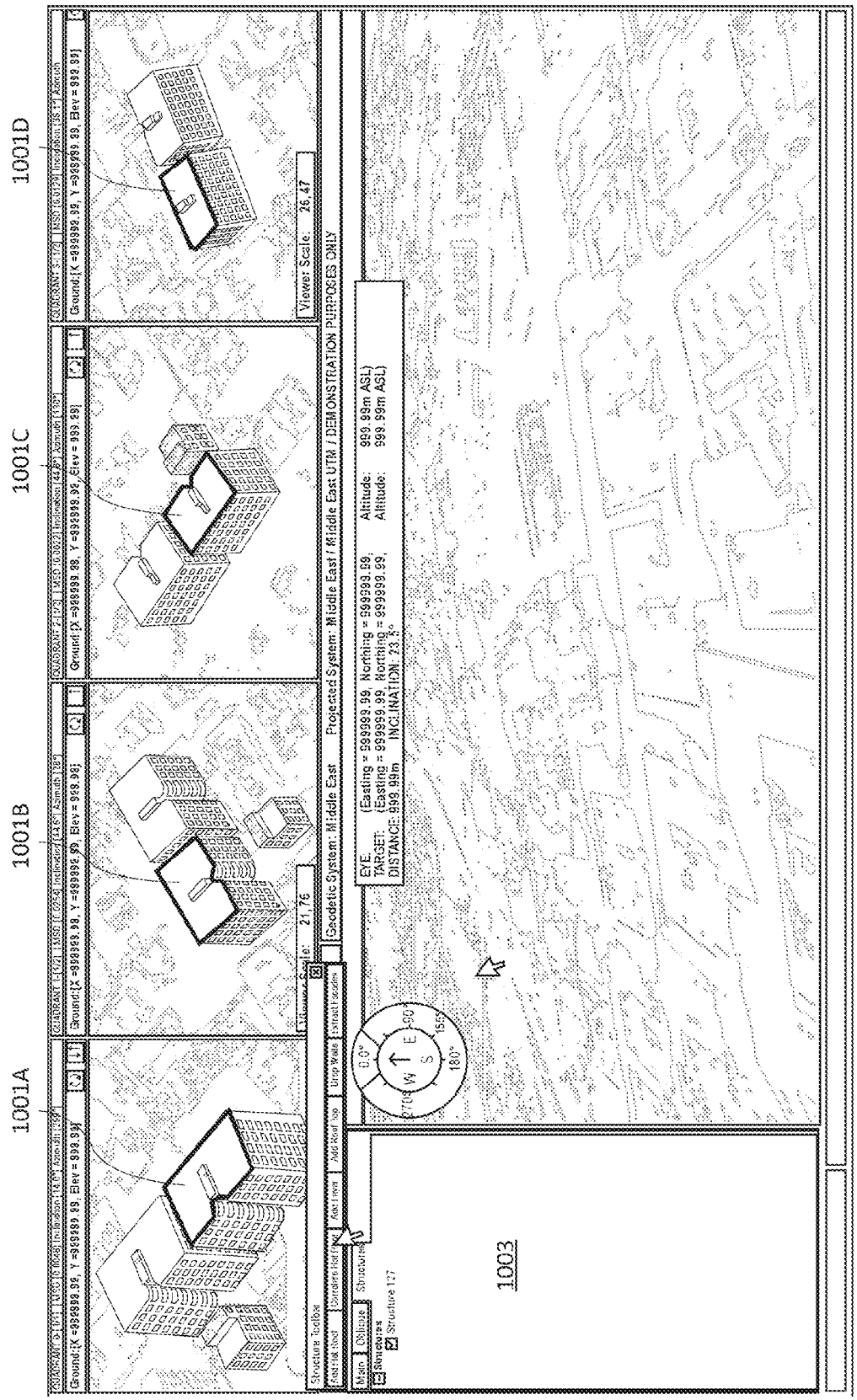
FIG. 10 is a diagram of one embodiment of an interface for displaying automatic structure detection.

FIG. 10 is a diagram of one embodiment of an interface for displaying automatic structure detection. It shows the next step of the structure extraction process such that the aspect of the structure identified in the first image has now been matched in each of the other images 1001A-D. In other embodiments, any number of images is simultaneously displayed and the identified structure is shown in each correlated image. In alternative embodiments, the identified structure is shown in vertical, oblique or any correlated images.

Once a structure is identified it may be saved and added to an aggregation of stored structures. Any number of structures is identified in the set of correlated images. Any number of structures is shown at any given time through the user interface. In one embodiment, the user interface includes a user interface selection mechanism 1003 to assist the user in organizing and viewing identified structures, images, projects and the like.

FIG. 11 is a diagram of one embodiment of an interface for three-dimensional structure display. The completed extraction is displayed in the model window 1103. The three-dimensional structure 1101 has been drawn on the terrain map that is draped with the vertical image. The three-dimensional model 1101 of the structure has been draped with the extracted textures from the other images to create a complete three-dimensional reproduction of the selected building. In other embodiments, this model is manipulated and viewed from any angle by manipulation of the available images presented through the visualization and analysis tool.

Figure 12:
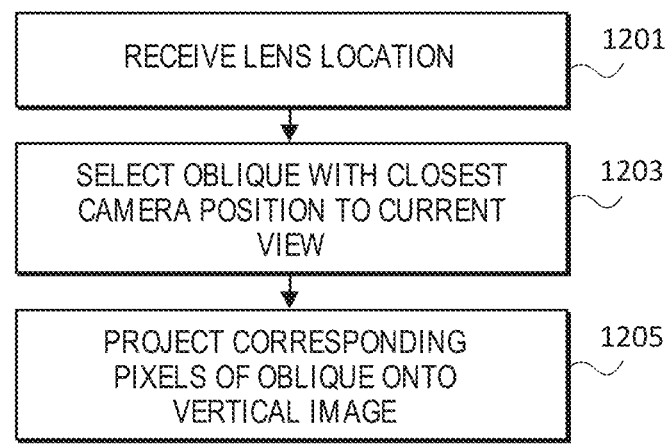
FIG. 12 is a flowchart of one embodiment of a process for lens projection.

FIG. 12 is a flowchart of one embodiment of a process for lens projection. The three-dimensional lens projection tool is activated by any type of selection mechanism through the user interface of the visualization and analysis tool. The user selects a position to display the lens (block 1201). The three-dimensional lens tool then determines the oblique image that has the closest camera position to the current view point of the user (block 1203). The portion of the image that maps onto the lens is then projected onto the three-dimensional terrain model that is draped with the vertical image (block 1205). The projection is a pixel by pixel projection onto the lens area. The projection is continuously updated. In other embodiments, the lens area is moved by user interaction with the user interface of the visualization and analysis tool, such as mouse or keyboard directional input. As the lens is moved, the projection of the pixels and the selection of the best oblique are updated.

Figure 13:
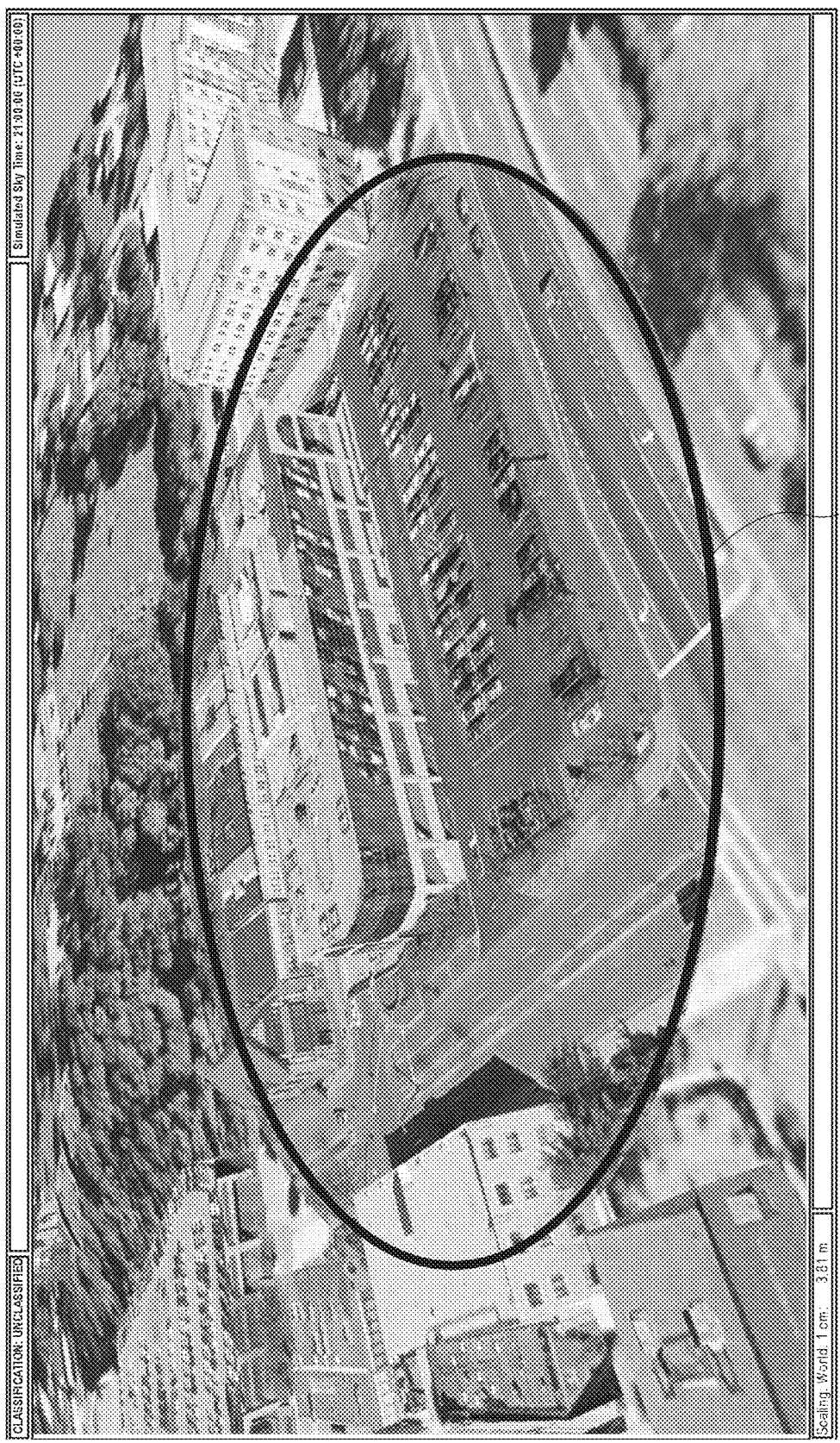
FIG. 13 is a diagram of one embodiment of an interface for displaying a three-dimensional lens.
Figure 14:
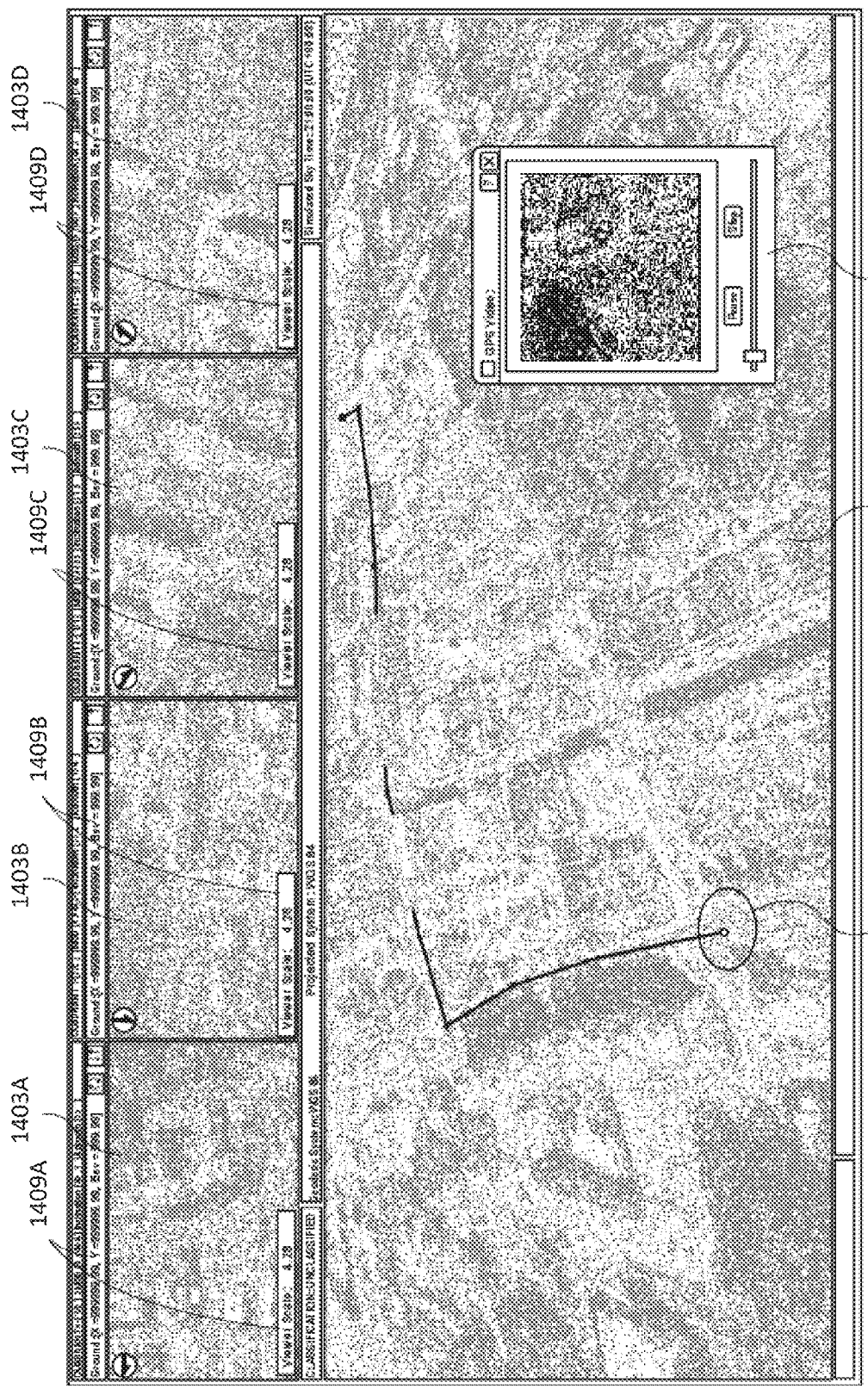
FIG. 14 is a diagram of one embodiment of an integrated visualization and analysis interface.

FIG. 13 is a diagram of one embodiment of an interface for displaying a three-dimensional lens. The lens area 1301 is movable by the user. Similarly, the underlying vertical image is repositioned. The interior of the lens area 1301 includes the mapped pixels of the oblique image that most closely aligns to the current user viewpoint of the vertical image. Any size or shape of lens area 1301 is utilized. In one embodiment, the lens area has a drawn boundary or the full lens area that is used to project the correlated image. In alternative embodiments, multiple lenses is positioned on an image FIG. 14 is a diagram of one embodiment of an integrated visualization and analysis interface. This image illustrates a set of windows for accessing the tools of the visualization and analysis tool. The visualization and analysis tool supports any number of images and related data sources being displayed. The displayed images includes correlated oblique images 1403A-D, a three-dimensional terrain model with a vertical image draped over it 1405, and similar content. A reference marker 1401 that indicates the common reference or view point for each of the currently displayed images. Other data sources, such as video sources 1407 that are related to a reference point or area that is currently displayed. Information displays 1409A-D that provides information about each of the images including orientation, scale, coordinates and similar information. In alternative embodiments, any number of other additional tools or components are displayed or accessed through the visualization and analysis tool including those discussed previous and those to be discussed subsequently.

Figure 15:
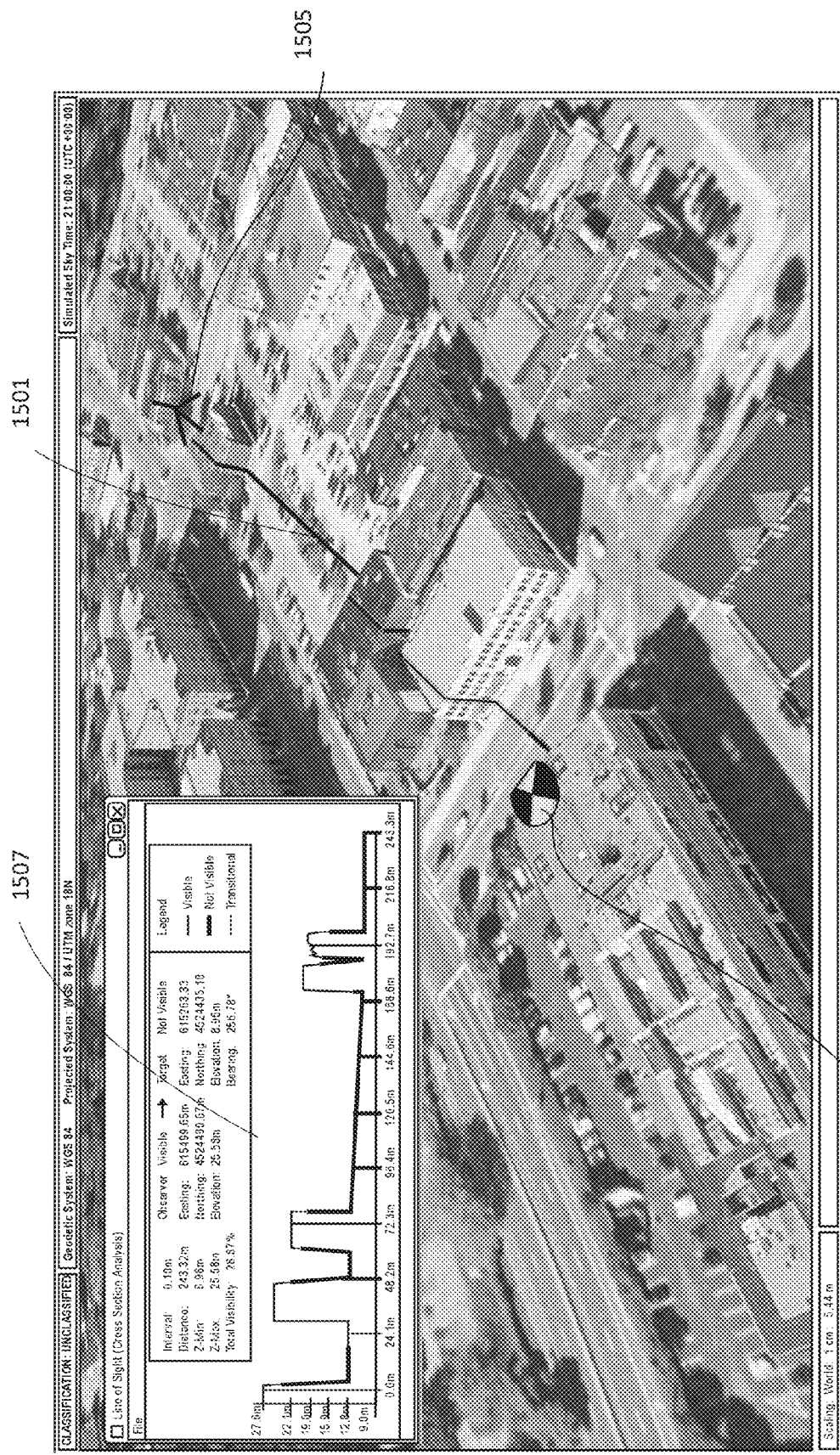
FIG. 15 is a diagram of one embodiment of an interface for displaying line of sight analysis.

FIG. 15 is a diagram of one embodiment of an interface for displaying line of sight analysis. The line of sight tool is displayed through the visualization and analysis tool. The line of sight tool includes the identification 1501 of the line of sight on the vertical image. A selected target point 1505 that a user desires to view and a selected viewpoint 1503 are part of the line of sight 1501. In other embodiments, a user selects any point within any image shown in the visualization and analysis tool as either a viewpoint or target point.

A horizontal line of sight map 1507 shows the elevation along the line of sight. This enables the user to determine at what point a viewpoint of the target is obstructed and other information about the line of sight. In other embodiments, the horizontal line map includes distance information, a determination of visibility of the target from the viewpoint, degree of visibility and similar information.

Figure 16:
FIG. 16 is a diagram of one embodiment of an interface for path finding visibility analysis.

FIG. 16 is a diagram of one embodiment of an interface for path finding and visibility analysis. In one embodiment, the visibility and path finding tools are combined to illustrate the visibility of an entire path. In some instances, this is useful for determining a safest route for a convoy or similar use. A user defines a path 1605 on the terrain map. The visibility component then determines all areas 1603 that view any portion of the path or the nearest portion of the path. In alternative embodiments, areas of visibility 1603 are colored or similarly identified. In other embodiments, the areas of visibility may be outlined, bordered or similarly indicated. Any number of paths and areas of visibility are determined and represented on any type of image that has been correlated. It is possible for paths that are identified to have any length or complexity.

Figure 17:
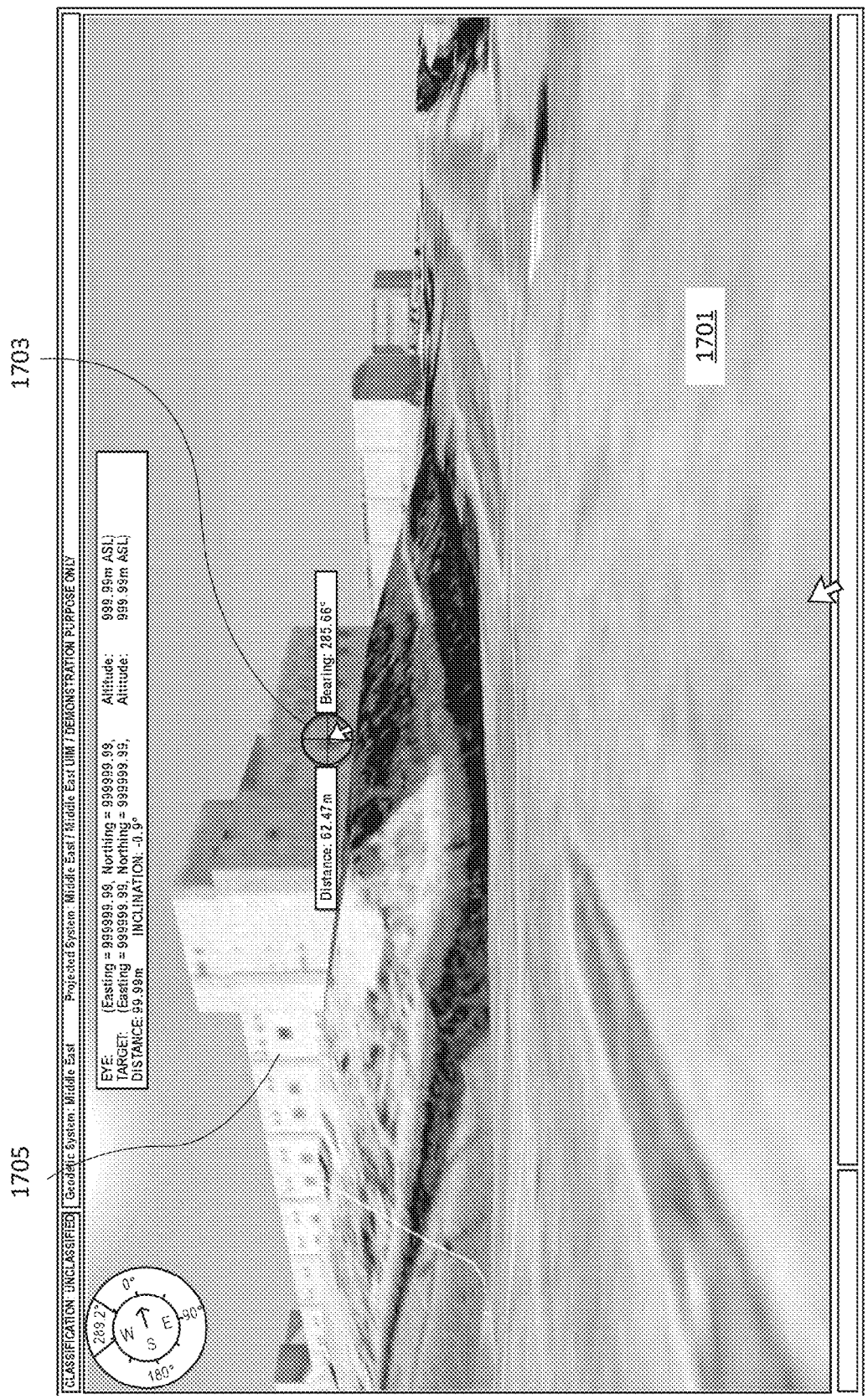
FIG. 17 is a diagram of one embodiment of an interface for first-person navigation.

FIG. 17 is a diagram of one embodiment of an interface for first-person navigation. The visualization and analysis tool includes a first person viewing mode in the user interface. The first person mode 1701 zooms into the terrain map and gives the user a perspective of an individual on the ground. The map is then be navigated through a peripheral device by moving the camera around as though walking or driving across the map. A targeting interface 1703 allows the user to select a location on the screen to determine distance, bearing and similar information. Extracted structures 1705 are also displayed as part of the three-dimensional navigable landscape. Any number of extracted structures 1705 are displayed. In alternative embodiments, other data is displayed including line of sight, pathfinding and similar data.

In other embodiments, the first-person navigation interface 1701 is utilized for training simulations, walk-throughs, and similar activities. The correlated image, model and structure data enable accurate recreation of real world settings in three-dimensional space using two-dimensional imagery. In alternative embodiments, additional graphical and three-dimensional models are added by a user to enhance the realism of the training simulation or walk-throughs such as vehicle models, vegetation simulation and similar elements.

In one embodiment, the geocoding engine, visualization tool and overall imaging system is implemented in software, for example, in a simulator, emulator or similar software. A software implementation includes a microcode implementation. A software implementation is stored on a machine readable medium. A "machine readable" medium includes any medium that stores or transfers information. Examples of a machine readable medium include a ROM, a floppy diskette, a CD-ROM, an optical disk, a hard disk, removable data storage such as memory sticks, universal serial bus memory keys or flash drives, compact flash, jump drives, DiskOnKey, portable image storage thumb drives and similar media and mediums. In one embodiment, the software implementation is in an object oriented paradigm or similar programming paradigm. The parts of the system may be structured and coded as a set of interrelated objects.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed technology described herein. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed technology described herein.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Throughout the specification, drawings and claims various terminology is used to describe the various embodiments. As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the terms "three-dimensional", "3D" and "three dimensional" are considered equivalent.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

What is claimed is:

1. A method of correcting incoherencies in three-dimensional (3D) building objects, comprising:
    analyzing the 3D building object for at least one incoherent angle or plane, the analyzing including establishing main axis grouping planes as determined by one or more angular thresholds, wherein at least one of the main axis grouping planes is used to generate a weighted edge plane for each plane edge, the weighted edge plane being generated for each edge that is a distance of a new edge from an initial edge plane multiplied by a grouping normal minus the initial edge plane multiplied by a weighted edge length;
    correcting the at least one incoherent angle or plane;
    iteratively recalculating additional building angle or plane positions to support the corrected at least one incoherent angle or planes; and
    redrawing the selected 3D building object according to the recalculated building angles and plane positions.

2. A method of correcting incoherencies in three-dimensional (3D) building objects, as per claim 1, wherein the 3D building object is a physical building corresponding to an object captured in an image.

3. A method of correcting incoherencies in three-dimensional (3D) building objects, as per claim 2, wherein the 3D building object is constructed from an oblique image.

4. A method of correcting incoherencies in three-dimensional (3D) building objects, as per claim 3, wherein the oblique image is captured from a ground based imaging system.

5. A method of correcting incoherencies in three-dimensional (3D) building objects, as per claim 1, wherein the at least one of the grouping planes is maintained as a sum of the weighted edge planes divided by a weighted edge length SUM.

6. A method of correcting incoherencies in three-dimensional (3D) building objects, as per claim 1, wherein the one or more angular thresholds are determined based on minimizing building vertex movement.

7. A method of correcting incoherencies in three-dimensional (3D) building objects, as per claim 1, wherein the at least one incoherent plane is analyzed by determining non-parallel planes.

8. A method of correcting incoherencies in three-dimensional (3D) building objects, as per claim 1, wherein architectural façades associated with specific sides of the 3D building object that are within a threshold of being parallel and near the same plane will be identified and snapped to the redrawn 3D building object.

9. A method of correcting incoherencies in three-dimensional (3D) building objects, as per claim 1, wherein the 3D building object selected was selected using a user interface by any of: entering in an address; automatically using a location of a user; by clicking the location on a map; or touching a location on a map.

10. A method of correcting incoherencies in three-dimensional (3D) building objects, comprising:
    analyzing the 3D building object for at least one incoherent angle or plane, the analyzing including establishing main axis grouping planes as determined by one or more angular thresholds, wherein at least one of the main axis grouping planes is used to generate a weighted edge plane for each plane edge, the weighted edge plane being generated for each edge that is a distance of a new edge from an initial edge plane multiplied by a grouping normal minus the initial edge plane multiplied by a weighted edge length, wherein at least one of the main axis grouping planes is maintained as a sum of the weighted edge planes divided by a weighted edge length sum;
    correcting the at least one incoherent angle or plane;
    iteratively recalculating additional building angle or plane positions to support the corrected at least one incoherent angle or planes; and
    redrawing the selected 3D building object according to the recalculated building angles and plane positions.

11. A method of correcting incoherencies in three-dimensional (3D) building objects, as per claim 10, wherein the 3D building object is a physical building corresponding to an object captured in an image.

12. A method of correcting incoherencies in three-dimensional (3D) building objects, as per claim 10, wherein the 3D building object is constructed from an oblique image.

13. A method of correcting incoherencies in three-dimensional (3D) building objects, as per claim 12, wherein the oblique image is captured from a ground based imaging system.

14. A method of correcting incoherencies in three-dimensional (3D) building objects, as per claim 10, wherein the one or more angular thresholds are determined based on minimizing building vertex movement.

15. A method of correcting incoherencies in three-dimensional (3D) building objects, as per claim 10, wherein the at least one incoherent plane is analyzed by determining non-parallel planes.

16. A method of correcting incoherencies in three-dimensional (3D) building objects, as per claim 10, wherein architectural façades associated with specific sides of the 3D building object that are within a threshold of being parallel and near the same plane will be identified and snapped to the redrawn 3D building object.

17. A method of correcting incoherencies in three-dimensional (3D) building objects, as per claim 10, wherein the 3D building object selected was selected using a user interface by any of: entering in an address; automatically using a location of a user; by clicking the location on a map; or touching a location on a map.

18. A system correcting incoherencies in three-dimensional (3D) building objects constructed from ground based oblique imagery, comprising:
a processor configured to:
analyze the 3D building object for at least one incoherent angle or plane, the analyzing including establishing main axis grouping planes as determined by one or more angular thresholds, wherein at least one of the main axis grouping planes is used to generate a weighted edge plane for each plane edge, the weighted edge plane being generated for each edge that is a distance of a new edge from an initial edge plane multiplied by a grouping normal minus the initial edge plane multiplied by a weighted edge length;
correct the at least one incoherent angle or plane;
iteratively recalculate additional building angle or plane positions to support the corrected at least one incoherent angle or planes; and
redraw the selected 3D building object according to the recalculated building angles and plane positions.

19. A system correcting incoherencies in three-dimensional (3D) building objects constructed from ground based oblique imagery, as per claim 18, wherein the ground based oblique imagery is captured from a ground based imaging system.

* * * * *